US008546729B2

(12) United States Patent
Derda

(10) Patent No.: US 8,546,729 B2
(45) Date of Patent: Oct. 1, 2013

(54) WIRED GLAZING

(75) Inventor: Martin Derda, Bochum (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 484 days.

(21) Appl. No.: 12/741,091

(22) PCT Filed: Nov. 4, 2008

(86) PCT No.: PCT/EP2008/064961
§ 371 (c)(1),
(2), (4) Date: May 3, 2010

(87) PCT Pub. No.: WO2009/059980
PCT Pub. Date: May 14, 2009

(65) Prior Publication Data
US 2010/0266832 A1     Oct. 21, 2010

(30) Foreign Application Priority Data
Nov. 5, 2007   (GB) .................................. 0721683.1

(51) Int. Cl.
*H05B 3/00* (2006.01)
(52) U.S. Cl.
USPC ................ 219/203; 174/113 C; 174/110 R; 343/711; 343/712
(58) Field of Classification Search
USPC .......................................................... 219/203
See application file for complete search history.

(56) References Cited

U.S. PATENT DOCUMENTS

| | | | |
|---|---|---|---|
| 3,440,408 A | 4/1969 | Brittan | |
| 3,629,040 A | 12/1971 | Hinton et al. | |
| 4,275,118 A | 6/1981 | Baney et al. | |
| 4,342,814 A * | 8/1982 | Usuki et al. ................... | 428/383 |
| 4,455,481 A * | 6/1984 | Van Hoof et al. ............. | 219/522 |
| 4,799,963 A | 1/1989 | Basil et al. | |
| 5,886,321 A | 3/1999 | Pinchok, Jr. et al. | |
| 6,008,473 A | 12/1999 | Gillner et al. | |
| 7,379,028 B2 * | 5/2008 | Hisaeda ........................ | 343/713 |
| 2001/0003222 A1 | 6/2001 | Snider | |

(Continued)

FOREIGN PATENT DOCUMENTS

| | | |
|---|---|---|
| DE | 94 12 666 U1 | 2/1995 |
| DE | 298 03 544 U1 | 4/1998 |

(Continued)

OTHER PUBLICATIONS

International Search Report issued by the European Patent Office on Apr. 7, 2009 as the International Searching Authority in International Application No. PCT/JP2008/064961.

(Continued)

*Primary Examiner* — Jerome Jackson, Jr.
(74) *Attorney, Agent, or Firm* — Buchanan Ingersoll & Rooney PC

(57) ABSTRACT

A laminated glazing (e.g. a vehicle windscreen) comprising two panes of glazing material (e.g. glass) having a ply of laminating interlayer extending between them, and one or more wires between the panes of glazing material, each having a conductive central core and an outer dark-colored (e.g. black) sheath, which is substantially resistant to color- and substance-degradation by ultraviolet light. The wires may be in the form of a capacitive sensing plate, an inductive coupling loop, a heating element, an antenna and/or an RFID tag.

18 Claims, 2 Drawing Sheets

(56) References Cited

U.S. PATENT DOCUMENTS

| | | |
|---|---|---|
| 2002/0005398 A1 | 1/2002 | Gillner et al. |
| 2003/0109599 A1 | 6/2003 | Kamen |
| 2003/0161997 A1 | 8/2003 | Moran |
| 2004/0159645 A1 | 8/2004 | Gillner et al. |
| 2006/0278803 A1 | 12/2006 | Mochizuki |

FOREIGN PATENT DOCUMENTS

| | | |
|---|---|---|
| EP | 0 849 977 A2 | 6/1998 |
| EP | 1 145 842 A2 | 10/2001 |
| GB | 1 300 276 A | 12/1972 |
| GB | 1 509 031 | 4/1978 |
| WO | WO 02/098176 A1 | 12/2002 |
| WO | WO 2005/102670 | 11/2005 |
| WO | WO 2008/058855 A1 | 5/2008 |

OTHER PUBLICATIONS

Search Report issued by the UK Intellectual Property Office in GB Application No. 0721683.1, Mar. 5, 2008.

* cited by examiner

WIRED GLAZING

The present invention relates to a wired glazing, especially to a laminated glazing, which includes one or more wires within its structure.

One or more wires may be included within a laminated glazing for a number of reasons. In the form of a grid typically co-extensive with a glazing, wires may enhance the structural integrity of the glazing. Present as a plurality extending over the whole or a part of a glazing, wires may enable the glazing to be heated when electrical current is supplied to them. One or more wires may be arranged so as to transmit/receive electromagnetic signals, for example forming an antenna, and/or to form part of an electrical circuit, for example a capacitive circuit.

For aesthetic reasons, when incorporated into a glazing, the one or more wires may be of a dark colour (for example dark grey or black) so as to minimise their visual appearance to the naked eye. Such practice is commonplace in the field of wired glazings, as described in for example EP 0 849 977 A1. The wires, which are typically made from a lustrous conductive material such as silver or copper, may be made dark in colour by coating their conductive cores with a suitably dark-coloured material, such as a black-tinted plastics material. In the absence of such a coating, incident light may be reflected off the surface of the conductive core in many directions. Not only may such an effect be visually unattractive, it may also be potentially distracting to a person close to the glazing (depending on the intended use for a glazing including such wires).

For some such glazings it has been observed that, unfortunately, one or more of the darkly coloured coated wires incorporated in them appear to suffer an amount of physical degradation, which may occur even after only a relatively short period of time following their production. The dark-coloured coating has been observed to have thinned, disappeared and/or decolourised (becoming more or less transparent) in patches on one or more wires, exposing areas of the lustrous conductive core. Incident light may then be reflected off these exposed areas and result in the occurrence of the undesirable effects described above.

Exposure of patches of conductive material may lead to further problems if the wires carry electric current. If two or more of these wires cross in the regions where they are mutually exposed, a short circuit may result—this is of course highly undesirable.

It is therefore an object of the present invention to provide a glazing incorporating one or more dark-coloured conductive wires which do not suffer the same physical degradation as prior art glazings.

Accordingly the present invention provides a laminated glazing comprising:
two panes of glazing material having a ply of laminating interlayer extending between them, and
one or more wires between the panes of glazing material, each having a conductive central core and an outer dark-coloured sheath,
wherein the sheath is substantially resistant to colour-and substance-degradation by ultraviolet light.

A wired laminated glazing according to the invention is superior to prior art glazings because the wires are visually unobtrusive to the naked eye, in that they remain dark-coloured for a significant portion of the lifetime of the glazing, and certainly for a greater length of time than with prior art glazings. Furthermore, because the wires remain dark-coloured, the problem of visual distraction due to reflections off the conductive central core of each is mostly if not entirely eliminated.

The panes of glazing material may be panes of glass, preferably soda-lime-silica glass which may be clear or body-tinted, or they may be panes of a rigid plastics material such as polycarbonate. Typically the panes of glazing material are used in a thickness between 1 and 10 mm, preferably between 1.5 and 6 mm.

Preferably the outer sheath is dark-grey or black in colour and the material from which it is made includes carbon. Dark-grey and black appear to be the most visually appealing and unobtrusive colours for the wires to be. A carbon-containing sheath is thought to be the preferred type of material for this purpose. The word "sheath" as used throughout this specification means both a) a sleeve of material which surrounds and envelopes the conductive central core of a wire and b) a coating which is deposited onto and adheres to the surface of the core of a wire. The outer sheath may be provided in a thickness of between 4 and 10 µm, preferably around 6 µm to fulfil its purpose.

Further preferably the material from which the outer sheath is made is graphite, or a graphite containing material. Under normal circumstances, graphite is an electrically conductive material, and so an inner (non-conducting) sheath may be provided between the central core of each wire and the outer sheath to separate the two electrically conductive materials. Of course, it may be desirable to provide an inner (non-conducting) sheath, regardless of the nature of the material of the outer sheath, so that the one or more wires may cross over one another without creating a short circuit.

Advantageously, the inner sheath may be made from a plastics material, which may be electrically insulating. Materials such as polyesterimid and polyurethane may be used, although any suitable thermoplastic or thermosetting plastic known in the art may also be used. The inner sheath may be provided in a thickness of between 3 and 8 µm, preferably around 6 µm to fulfil its purpose. Because the inner sheath of material is enveloped by the outer sheath, its colour is not critical. However, to be able to monitor the ultraviolet radiation resistance of the outer sheath (for example by checking for patches of conductive core that may show through the outer sheath) the inner sheath may be made from a transparent material.

Advantageously, an outermost sheath, made of a material capable of bonding with the ply of interlayer material, is provided on each wire. The interlayer material and outermost sheath may be provided as one of the following types of material (and they need not be of the same material): polyvinyl chloride (PVC), polyurethane (PU), ethylvinylacetate (EVA), polyethylene terephthalate (PET), polyamide (PA) or polyvinyl butyral (PVB). The ply of interlayer material may typically be provided in thickness of either 0.76 mm or 0.38 mm. The outermost sheath may preferably be provided in a thickness of up to 10 µm.

It may be that bonding is only fully effective when the glazing is subjected to elevated temperature and pressure, for example in an autoclave. However, some or most of the bonding between the one or more wires and the ply of interlayer material may be achieved as the wires are laid into their desired configuration. The wires may be deposited directly onto a ply of interlayer material, using any suitable technique such as ultrasonic bonding or resistive heating.

The conductive central core of each wire may be made from a metal, metal alloy or metal oxide material. Silver and copper appear to be the most suitable because of their high conductivity compared to other materials. Preferably the diameter of the central core of each wire is in the range 35 to 150 µm, further preferably in the range 40 to 90 µm and most preferably around 70 µm. Such a diameter is thought to be optimal to achieve the balance between good conductivity/resistivity and visual appearance.

Preferably the one or more wires are arranged in the form of sensing area of a capacitive rain sensor, effectively forming one or more capacitive plates. As is known in the art, a capacitive rain sensor may be included a glazing, especially a vehicle glazing, to enable automatic operation of wiper blades.

In addition (or as an alternative), the one or more wires may also be arranged in the form of an inductive coupling coil, for inductively coupling electrical current through the plies of the glazing from the coupling coil (which may be attached to an electrical device, such as the sensing area of a capacitive rain sensor, within the glazing) to an electrical device on the exterior of the glazing.

Further additionally or alternatively the one or more wires may be arranged in the form of a heating element, which is capable of resistively heating the plies of glazing material to enable de-misting and de-icing of the glazing. Such a heating element may be used to heat an area of the glazing through which a camera operates.

Yet further additionally or alternatively, the one or more wires may be arranged to form an antenna, for transmitting and/or receiving electromagnetic radiation, such as a wired patch antenna as described in copending application PCT/EP2007/061839, or as a radio-frequency identification (RFID) tag for storing information about the glazing.

Although a glazing according to the invention may be used in any position or location where a laminated glazing is typically installed, it is most preferably used as a vehicle glazing. Further preferably, the glazing may be used as a windscreen, although it may also be used as a backlight (rear window), sidelight (side window) and/or rooflight (roof glazing).

For a better understanding the present invention will now be more particularly described, by way of non-limiting example, with reference to and as shown in the accompanying schematic drawings (not to scale) in which.

Figure 1:
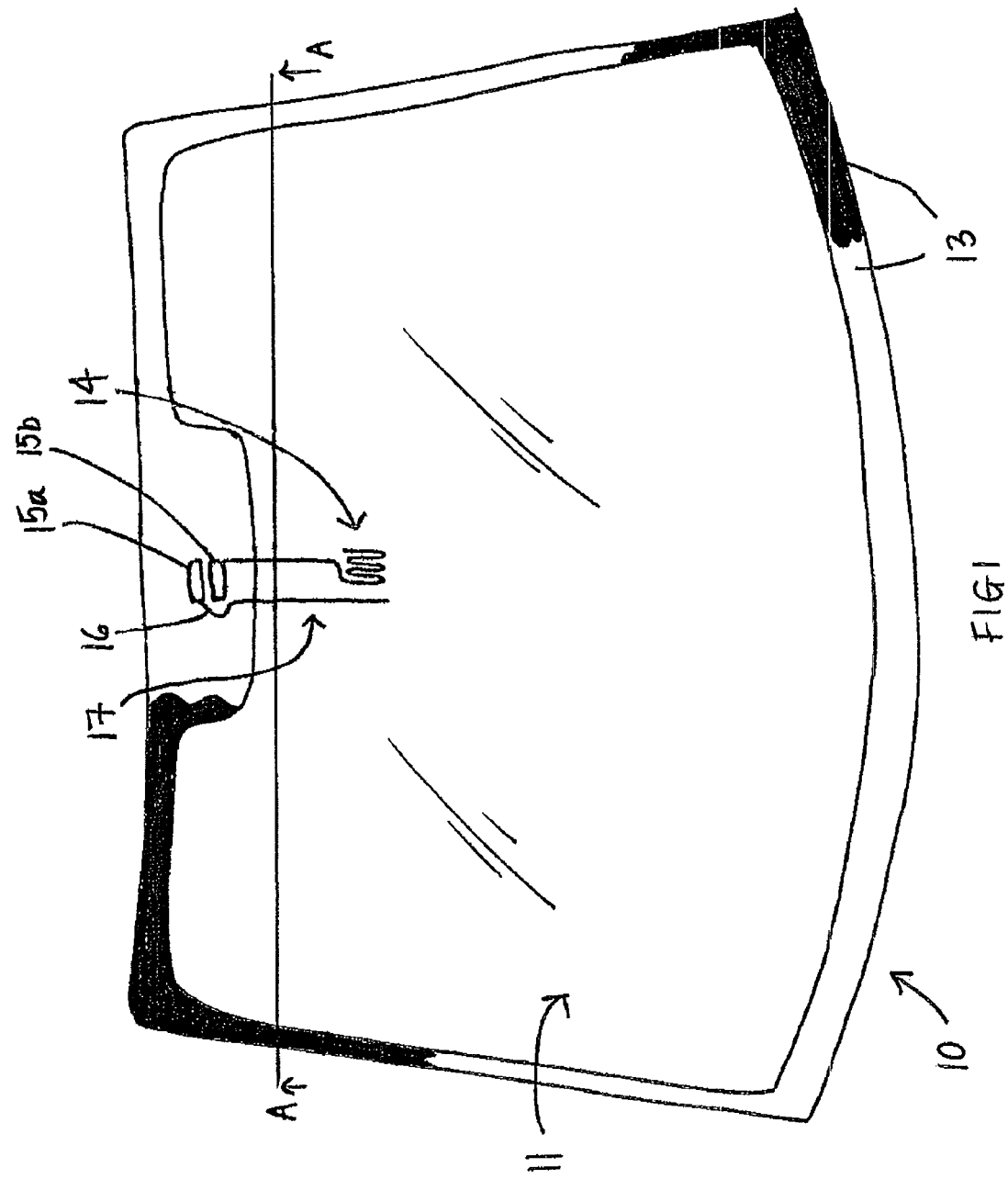
FIG. 1 is a plan view of a laminated glazing according to the invention.

FIG. 1 shows a laminated glazing, in the form of a vehicle windscreen 10, comprising an outer pane of glazing material, in the form of a pane of 2.1 mm thick green-tinted soda-lime-silica glass 11, and one or more wires 16, arranged into the form of a capacitive rain sensor 14, a temperature compensation structure 17 and inductive coupling coils 15a, 15b. Rain sensor 14 and temperature compensation structure 17 are mostly located in the vision area of the glazing, whereas coils 15a, 15b are hidden from view. Around the periphery of windscreen 10 there is a band of opaque ink (typically a black enamel), in the form of an obscuration band 13. Obscuration band 13 is there to disguise and protect the sealant (not shown) that is used to fix the window into a vehicle (not shown), and also to hide inductive coupling coils 15a, 15b.

Figure 2:
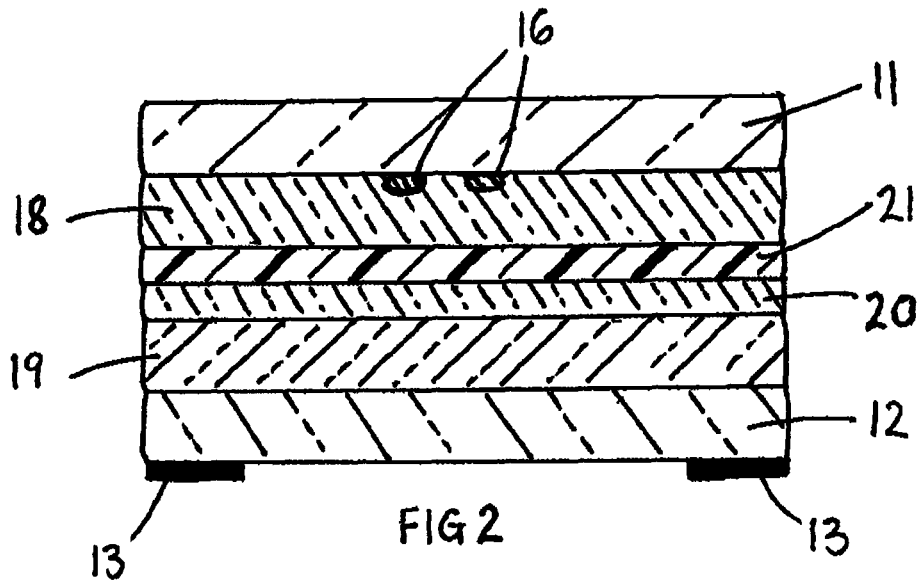
FIG. 2 is a cross-section viewed along line A-A of FIG. 1.

FIG. 2 provides more detail about the construction of windscreen 10 in that it further comprises inner pane of glazing material, also in the form of a 2.1 mm thick pane of green-tinted soda-lime-silica glass 12, and a composite interlayer constructed from three plies of interlayer material. These plies of interlayer material are in the form of two outer plies of 0.38 mm thick clear PVB 18, 19 and a central ply of PET 20, on which a silver-based coating stack 21 facing outer pane of glass 11 is located, to reflect solar radiation. As an alternative to the composite interlayer having a solar control function, windscreen 10 may comprise a ply of PVB 18 and a solar control coating (not shown) on the inner surface of outer glass 11 and/or inner glass 12.

Panes of green-tinted glass 11, 12 of approximate composition 72% (by weight) $SiO_2$, 1% $Al_2O_3$, 13.5% $Na_2O$, 0.6% $K_2O$, 8.5% CaO, 4% MgO, 0.2% $SO_3$ and 0.58% total iron as $Fe_2O_3$ may be obtained from Pilkington Group Limited in the UK (www.pilkington.com). Ply of PET 20 bearing silver-based coating 21 may be obtained from Southwall Technologies Inc., 3975 East Bayshore Road, Palo Alto, Calif. 94303, US (www.southwall.com).

Figure 3:
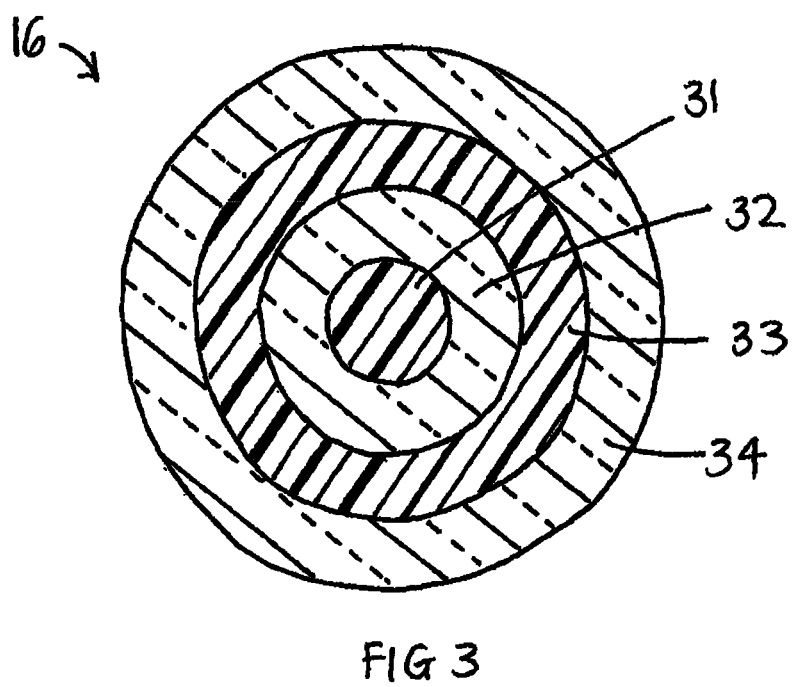
FIG. 3 is a cross section of a wire.

Wires 16 are located between ply of PVB 18 and outer pane of glass 11, to enable capacitive detection of the presence of raindrops on the outer surface of outer pane of glass 11. Wires 16 are bonded to both ply of PVB 18 and outer pane of glass 11 because each is provided with an outermost sheath of PVB. The detail of the structure of wires 16 is shown in FIG. 3, which illustrates that each wire 16 has a tri-layer sheath surrounding its central conductive core, in the form of a length of copper 31 of 71 μm diameter. Copper core 31 is provided with an inner (non-conducting) sheath, in the form of a 7 μm thick polyurethane coating 32. Coating 32 is provided with an outer sheath, in the form of a 6 μm thick graphite coating 33. Finally coating 33 is provided with an outermost sheath, in the form of a 6 μm thick PVB coating. Such wires 16 are available under the product number BP 180 from Elektrisola Eckenhagen, In der Hüttenwiese, 51580 Reichshof-Eckenhagen, Germany (www.elektrisola.com).

To illustrate the ultraviolet degradation resistance of wires 16, sample glazings were subjected to two tests. Two batches of samples representative of the windscreen 10 were prepared. In batch 1 five samples measuring 30 cm×30 cm, and in batch 2 five samples measuring 30 cm×8 cm, were prepared by laminating together two plies of 2.1 mm thick green-tinted glass (as above) with a ply of 0.76 mm thick clear PVB (as above), along with wires (as above) in the form of a capacitive rain sensing plate, temperature compensation structure and inductive coupling coils as shown in FIG. 1.

The first test involved visual inspection of samples from each batch both before and after they were directly subjected to ultraviolet radiation for a period of 3000 hours from two different sources:

(1) an array of 16 ULTRA-VITALUX™ sun lamps per square meter (available from OSRAM GmbH, Hauptverwaltung, Hellabrunner Straβe 1, 81543 München, Germany (www.osram.com)), providing 1 kW/m² of irradiance when positioned at a distance of 50 cm from each sample; and (2) a XENOTEST™ Beta+ xenon arc instrument used with a Xenochrome 300 filter (available from Atlas Material Testing Technology GmbH, Vogelsbergstraβe 22, 63589 Linsengericht, Germany (www.atlas-mts.com)), providing a 4,000 cm² area of exposure.

All the samples in both batches passed the visual inspection test with both light sources, in that there was no visual change in the black colouration of the wires at the end of the 3000 hour test period. Furthermore, the wires appeared to have remained well adhered inside each of the samples.

The second test measured the resonance frequency of the capacitive rain sensor plates and temperature compensation structures in each of the samples both before and after they were subjected to ultraviolet radiation for a period of 3000 hours from the same two light sources (1) and (2) above. To perform this test a single length of wire was formed into a loop of the same dimensions as the inductive coupling coils in each sample. This loop was systematically aligned with the inductive coupling coils in each sample and the free end connected to an HP 8753A Networkanalyser to take the measurements. The results of this test are shown in the following table, with the results normalised to a temperature of 20° C. to eliminate the effect of fluctuating temperature.

| | Average Resonance Frequency (MHz) Prior to UV Exposure | | Average Resonance Frequency (MHz) Following UV Exposure | | Resonance Frequency Variance (%) | |
| --- | --- | --- | --- | --- | --- | --- |
| Light Source | Temperature Compensation Structure | Rain Sensor Structure | Temperature Compensation Structure | Rain Sensor Structure | Temperature Compensation Structure | Rain Sensor Structure |
| (1) | 17.76 | 15.49 | 17.73 | 15.52 | 0.121 | 0.199 |
| (2) | 17.7 | 15.17 | 17.808 | 15.255 | 0.107 | 0.083 |

It can be seen that there is variation of less than 0.2% in the resonance frequency of the samples once they have been irradiated with UV, proving the reliability of the tri-layer coated wires to satisfactorily perform the function of a capacitor and inductive coupling coil.

The invention claimed is:

1. A laminated glazing comprising:
   two panes of glazing material having a ply of laminating interlayer extending between them, and
   one or more wires between the panes of glazing material, each having a conductive central core and a conductive outer dark-coloured sheath,
   wherein the dark-coloured sheath is substantially resistant to colour- and substance-degradation by ultraviolet light, and
   wherein an inner non-conducting sheath is provided between the central core of each wire and the outer sheath.

2. A laminated glazing as claimed in claim 1 wherein the dark-coloured sheath is dark-grey or black in colour and the material from which it is made includes carbon.

3. Laminated glazing as claimed in claim 2 wherein the material of the dark-coloured sheath is graphite or a graphite-containing material.

4. A laminated glazing as claimed in claim 1 wherein the inner sheath is made from a plastics material.

5. A laminated glazing as claimed in claim 1 wherein the inner sheath is transparent.

6. A laminated glazing as claimed in claim 1 wherein an outermost sheath, made of a material capable of bonding with the ply of interlayer material, is provided on each wire.

7. A laminated glazing as claimed in claim 1 wherein the conductive central core of each wire is made from a metal, metal alloy or metal oxide material.

8. A laminated glazing as claimed in claim 1 wherein the diameter of the central core of each wire is in the range 35 to 100 μm.

9. A laminated glazing as claimed in claim 1 wherein the one or more wires are arranged in the form of sensing area of a capacitive rain sensor.

10. A laminated glazing as claimed in claim 9 wherein the one or more wires are also arranged in the form of an inductive coupling coil.

11. A laminated glazing as claimed in claim 1 wherein the one or more wires are arranged in the form of a heating element.

12. A laminated glazing as claimed in claim 1 wherein the one or more wires are arranged to form an antenna.

13. Use of a laminated glazing as claimed in claim 1 as a vehicle glazing.

14. Use of a laminated glazing as claimed in claim 13 as a windscreen, backlight, sidelight and/or rooflight.

15. A laminated glazing as claimed in claim 4 wherein the inner sheath is transparent.

16. A laminated glazing as claimed in claim 2 wherein an outermost sheath, made of a material capable of bonding with the ply of interlayer material, is provided on each wire.

17. A laminated glazing as claimed in claim 3 wherein an outermost sheath, made of a material capable of bonding with the ply of interlayer material, is provided on each wire.

18. A laminated glazing comprising:
   two panes of glazing material having a ply of laminating interlayer material extending between them; and
   at least one wire between the panes of glazing material, the at least one wire comprising a conductive central core, an outermost sheath, a conductive outer sheath disposed between the conductive central core and the outermost sheath, and an inner sheath disposed between the conductive central core and the outer sheath,
   wherein the inner sheath is made from a non-conducting material, the outer sheath is made from a material which is substantially resistant to colour- and substance-degradation by ultraviolet light, and the outermost sheath is made from a material capable of bonding with the ply of interlayer material.

\* \* \* \* \*